F. DOWD.
WHEEL TIRE.
APPLICATION FILED OCT. 10, 1910.

1,002,654.

Patented Sept. 5, 1911.

2 SHEETS—SHEET 1.

ATTEST
E. M. Fisher
H. H. Knapp

INVENTOR
Frank Dowd

By Fisher & Moore ATTYS.

COLUMBIA PLANOGRAPH CO., WASHINGTON, D. C.

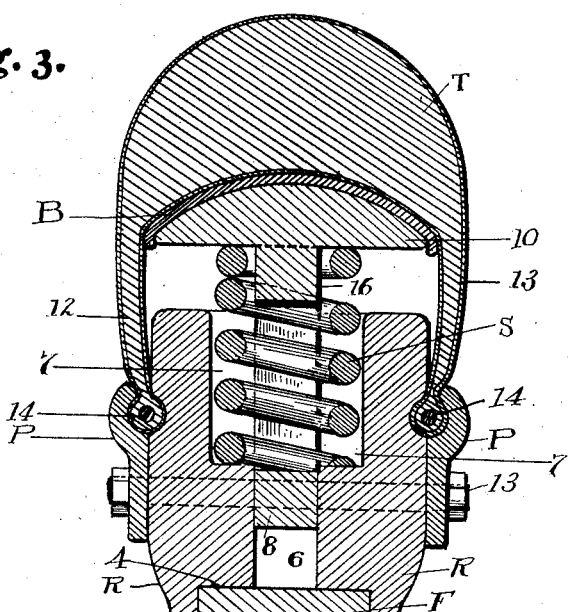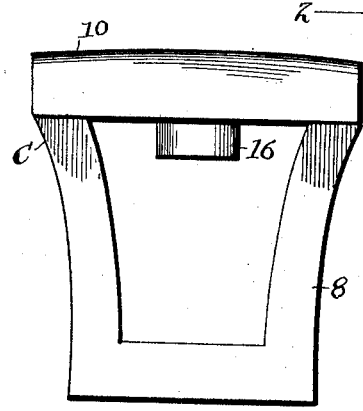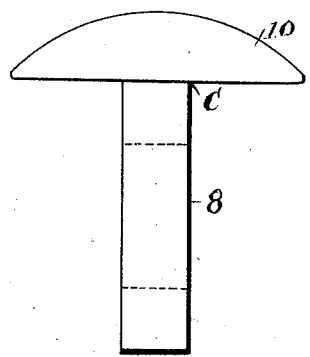

UNITED STATES PATENT OFFICE.

FRANK DOWD, OF CLEVELAND, OHIO, ASSIGNOR OF ONE-HALF TO HERBERT H. DOWD, OF CLEVELAND, OHIO.

WHEEL-TIRE.

1,002,654.  Specification of Letters Patent.  Patented Sept. 5, 1911.

Application filed October 10, 1910. Serial No. 586,174.

*To all whom it may concern:*

Be it known that I, FRANK DOWD, a citizen of the United States, residing at Cleveland, in the county of Cuyahoga and State of Ohio, have invented certain new and useful Improvements in Wheel-Tires, of which the following is a specification.

My invention relates to wheel tires, and the invention consists in a tire which is provided with a series of metallic springs and other parts arranged about or in the periphery of the wheel and adapted to substitute the usual pneumatic tire to provide the desired resiliency, all substantially as shown and described and particularly pointed out in the claims.

Figure 1:
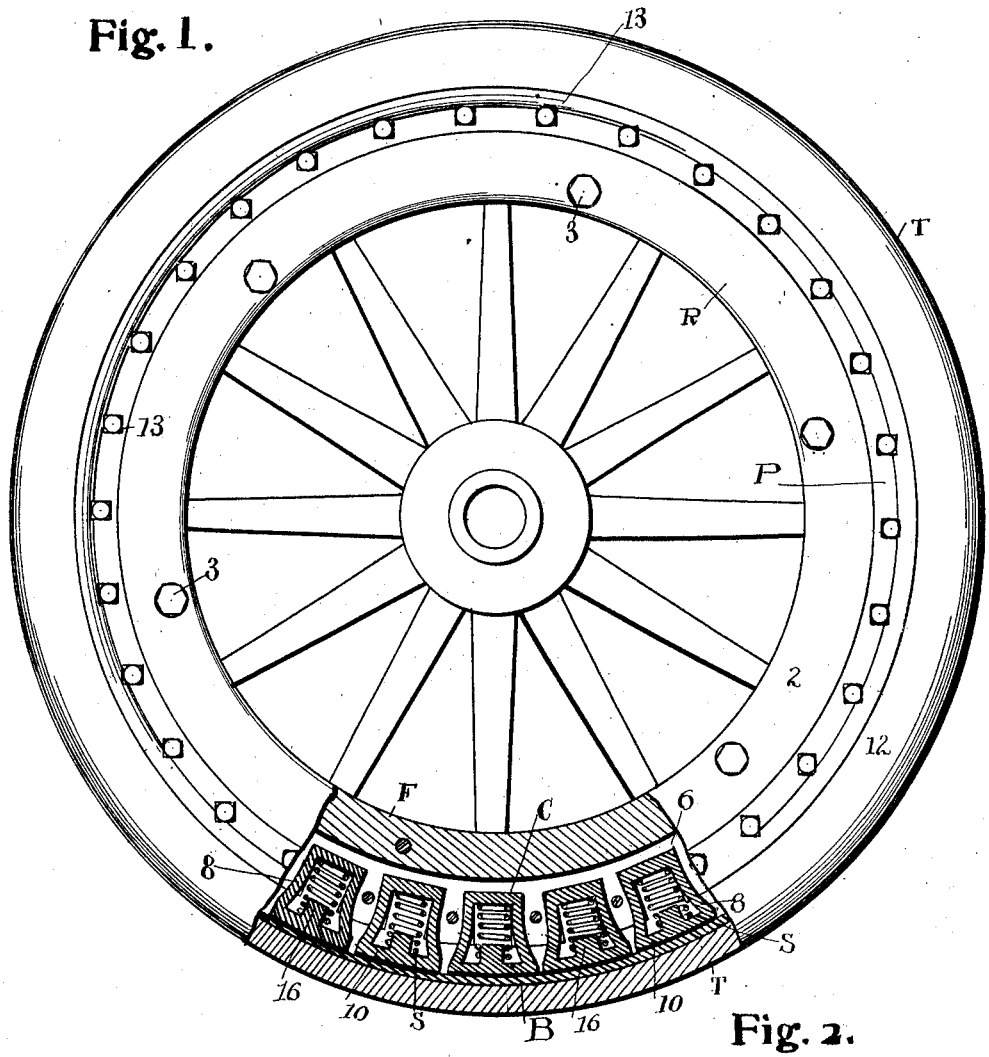
Figure 2:
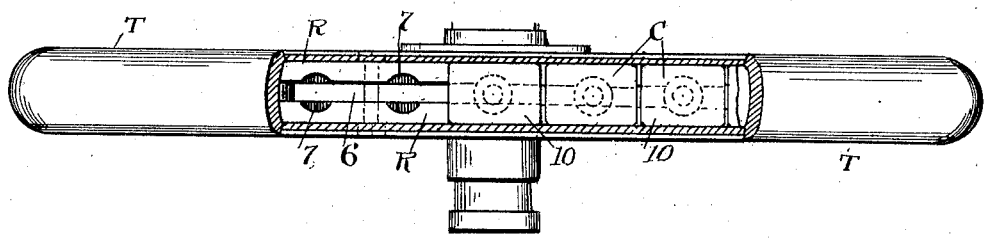

In the accompanying drawings, Figure 1 is a side elevation of a wheel embodying my invention, a portion thereof being sectioned off to show detailed constructions, and Fig. 2 is an edge view of the wheel with a portion of the periphery broken away and some of the separate parts removed to show internal features as hereinafter fully described. Fig. 3 is a cross section of a portion of the wheel, and Figs. 4 and 5 are elevations of a detail.

The construction of the parts of the wheel involved in the invention are plainly shown in the foregoing views and together constitute a complete substitute for the pneumatic tire in all the essentials of such a tire so far as perfectly cushioned tread is concerned and in and through which the effect of all small obstructions passed over by the wheel is absorbed and the easy resiliency of a pneumatic tire is preserved. To these ends the wheel is constructed with what may be regarded as the usual felly or rim F, upon or about which the invention is built and which is supplemented by two rims R, which are shouldered or recessed to engage part way over said rim from opposite sides and have flanges 2 through which said rims are firmly secured to the felly by bolts 3. The shoulders 4 of said rims, so-called, extend in over the felly about one-third its depth, more or less, and thus leave a space between the said parts which constitutes what may be considered practically as a circumferential slot 6, open outward all around and serving as a space adapted to receive the carrier C, as will presently appear. Substantially cup shaped cavities or pockets 7 are formed at regular intervals in and between the said rims, a segmental portion of each cavity coming in each rim as seen in Fig. 2, and adapted to receive a suitable spiral spring S. One of these springs is provided for each of said cavities, a portion resting on each rim and said spring is so confined between the surrounding walls of said cavities as to have the necessary freedom to perform all the functions for which it is intended, while it is also held definitely in working position, and where it cannot fail to work as intended. The said carriers have a somewhat peculiar and original shape and together constitute a series of spring supported members adapted to come to the tread of the wheel as the actual carriers of the load as well as becoming the cushioning members for the load. Each carrier, therefore, has an open work or skeleton body portion 8 with straight sides adapted to enter the said slot 6 and to play therein within limits under the support of the springs S as it comes into the immediate tread, and to this end is further provided with a head 10, as seen in Figs. 4 and 5. The said head has a width laterally wide enough to support the outer tire proper indicated by T, and to overlap the rims R, while in the view Fig. 4 the length of the head is such as to cause it to assume only a portion of the load at any time, or rather that two and possibly three of said carriers may be under the load at a given time, thus distributing and dividing the pressure. The arrangement of said carriers furthermore is such as to bring them approximately in contact one with the other at the periphery as seen in Fig. 1, and they are arranged to sustain the same working relation all around the wheel, so that the working conditions will be the same and uniform. In the present wheel I show and employ a preferably leather belt B, about the outside of said carriers, the same being stretched over the heads 10 and serving to hold all the carriers together and in place when for any reason the rubber tire T is removed. Possibly a woven or textile band would serve as well as leather but I prefer leather. The tire T is engaged about said band and is provided with extensions or sides 12 of sufficient radial depth to overlap the outer side portions of the rims R and make an effective engagement therewith. To this end also I provide a ring shaped clamping plate P or its equivalent which is bolted at intervals to or through the said rims by bolts 13 and has a channel or groove on its inner side adapted to engage over and bind upon a bead 14 on each edge of said tire. The effect of this construction and arrangement of parts must in any event be such as to perfectly secure the tire upon the wheel, and the clamping engagement as provided for herein effects this purpose when properly made.

Bolts 15 are provided successively between all the carriers C, which while they permit the carriers to have all needed radial play or action as well as to rock more or less in the direction of travel, will keep and confine said carriers in their places circumferentially. Laterally the side walls R serve this purpose.

The carriers have studs 16 centrally inside of a sufficient depth to center and confine the corresponding spring S therein and which otherwise rests and is confined in its cavity.

Any suitable tire T may be used with such depth of tread as may seem best, and can be removed and replaced without disturbing the other parts. However this contemplates the use of a solid rubber tire and hence there is no puncturing of the tire as in the case of the pneumatics and all the other objections to such tires are avoided and with equally good work results in so far as comfort in riding is concerned.

What I claim is:

1. A vehicle wheel having a felly and side rims bolted through said felly and having shouldered portions spaced apart centrally of the periphery of the felly to provide a central circumferential slot, in combination with a series of tire carriers mounted in said slot between said rims and a spring support within each of said carriers having bearings in the side walls of said side rims and flexible band encircling and confining all said carriers, whereby said carriers are adapted to swing more or less in the direction of travel, said carriers having heads rounded laterally and to conform to the periphery of the wheel.

2. The construction shown comprising a wheel with side rims at its periphery spaced apart centrally of the wheel and having cavities at intervals formed partially in each rim, in combination with carriers for the tire slidably mounted between said rims, a spring within each of said carriers and resting between the base of one of said cavities and the head of the carrier, a belt of flexible material confining all said carriers about the heads thereof and a tire about said belt fixed at its edges at the sides of said rims.

3. The wheel described having a felly, rims about the sides thereof provided with shouldered portions resting on the periphery of the felly and spaced apart thereon and provided with cavities at intervals formed partly in each of said shouldered portions, in combination with a carrier corresponding to each cavity having an open work body portion with flat sides extending into the space between said shouldered portions of said rims and having each an externally rounded head, and a spiral spring seated within each of said carriers and resting at its bottom in one of said cavities and bearing at its top against the head of the carrier.

In testimony whereof I affix my signature in presence of two witnesses.

FRANK DOWD.

Witnesses:
E. M. FISHER,
F. C. MUSSUN.

---

Copies of this patent may be obtained for five cents each, by addressing the "Commissioner of Patents, Washington, D. C."